(12) United States Patent
Macciola et al.

(10) Patent No.: US 9,946,985 B2
(45) Date of Patent: Apr. 17, 2018

(54) TOUCHLESS MOBILE APPLICATIONS AND CONTEXT-SENSITIVE WORKFLOWS

(71) Applicant: Kofax, Inc., Irvine, CA (US)

(72) Inventors: Anthony Macciola, Irvine, CA (US); Jan W. Amtrup, Silver Spring, MD (US); Jiyong Ma, San Diego, CA (US)

(73) Assignee: KOFAX, INC., Irvine, CA (US)

( * ) Notice: Subject to any disclaimer, the term of this patent is extended or adjusted under 35 U.S.C. 154(b) by 83 days.

(21) Appl. No.: 15/214,346

(22) Filed: Jul. 19, 2016

(65) Prior Publication Data
US 2016/0328667 A1 Nov. 10, 2016

Related U.S. Application Data

(60) Continuation-in-part of application No. 15/134,318, filed on Apr. 20, 2016, now Pat. No. 9,747,269, (Continued)

(51) Int. Cl.
*G06K 9/72* (2006.01)
*G06Q 10/06* (2012.01)
(Continued)

(52) U.S. Cl.
CPC ......... *G06Q 10/0633* (2013.01); *G06F 3/167* (2013.01); *G06K 9/00442* (2013.01);
(Continued)

(58) Field of Classification Search
CPC .... G06K 9/00442; G06K 9/18; G06K 9/2018; G06K 9/00469; G06K 2209/21; (Continued)

(56) References Cited

U.S. PATENT DOCUMENTS 8,768,712 B1 * 7/2014 Sharifi ............... G10L 15/08
704/270
2014/0184471 A1 * 7/2014 Martynov ............ G06F 3/1423
345/1.2
(Continued)

OTHER PUBLICATIONS

James Mash, "The Best Google Now Voice Commands" Oct. 24, 2014,Chinavasion, Retrieved from Internet on Nov. 14, 2017, from URL:<https://blog.chinavasion.com/26071/the-best-google-now-voice-commands/>.*

(Continued)

*Primary Examiner* — Gregory F Cunningham
(74) *Attorney, Agent, or Firm* — Zilka-Kotab, P.C.

(57) ABSTRACT

Systems, methods, and computer program products are disclosed for performing workflows using a mobile device, without requiring tactile input from the user. The workflow is thus "touchless" and may utilize input preferably including optical data and/or audio data. Tactile input may be optionally provided in some embodiments, but the workflow is configured to be performed without any tactile input. Accordingly, in one embodiment, a computer-implemented method for performing a touchless mobile workflow includes: invoking a mobile application using a mobile device; receiving auditory input via the mobile device; and performing a business workflow via the mobile application based on the auditory input. Corresponding systems and computer program product embodiments configured for touchless mobile workflows are also described.

20 Claims, 4 Drawing Sheets

Related U.S. Application Data which is a division of application No. 14/686,644, filed on Apr. 14, 2015, now Pat. No. 9,349,046.

(60) Provisional application No. 61/979,949, filed on Apr. 15, 2014, provisional application No. 62/194,786, filed on Jul. 20, 2015.

(51) Int. Cl.

| | | |
|---|---|---|
| *G06F 3/16* | (2006.01) | |
| *G06T 1/00* | (2006.01) | |
| *G10L 17/22* | (2013.01) | |
| *G06Q 10/10* | (2012.01) | |
| *G06K 9/00* | (2006.01) | |
| *G06K 9/18* | (2006.01) | |
| *G06K 9/20* | (2006.01) | |
| *H04N 1/40* | (2006.01) | |

(52) U.S. Cl.
CPC ............ *G06K 9/18* (2013.01); *G06K 9/2018* (2013.01); *G06Q 10/10* (2013.01); *G06T 1/0007* (2013.01); *G10L 17/22* (2013.01); *H04N 1/40* (2013.01); *G06K 2209/21* (2013.01)

(58) Field of Classification Search
CPC .... G06F 17/243; G06F 17/211; G06F 17/276; H04N 1/40; G06Q 10/10
USPC ........................................................ 382/229
See application file for complete search history.

(56) References Cited

U.S. PATENT DOCUMENTS

| | | | |
|---|---|---|---|
| 2016/0267230 A1* | 9/2016 | Ochs ..................... | G06F 19/328 |
| 2016/0364774 A1* | 12/2016 | Wittsiepe ........... | G06Q 30/0282 |

OTHER PUBLICATIONS

Kevin Krause, "The best Android feature you're not using: voice commands", May 29, 2014, Phandroid, Retrieved from Internet on Nov. 14, 2017, from URL:<https://phandroid.com/2014/05/29/google-now-voice-commands/>.*

* cited by examiner

TOUCHLESS MOBILE APPLICATIONS AND CONTEXT-SENSITIVE WORKFLOWS

RELATED APPLICATIONS

This application is related to U.S. Provisional Patent Application No. 62/194,786, filed Jul. 20, 2015; U.S. Pat. No. 8,855,375, filed Jan. 11, 2013, U.S. Pat. No. 8,855,425, filed Jul. 22, 2013; U.S. Pat. No. 9,355,312, filed Mar. 13, 2013; U.S. Pat. No. 9,311,531, filed Mar. 13, 2014; U.S. Pat. No. 8,885,229, filed May 2, 2014; U.S. Pat. No. 9,058,580, filed Mar. 19, 2014, and U.S. Pat. No. 9,349,046, filed Apr. 14, 2015, each of which are hereby incorporated by reference.

FIELD OF INVENTION

The present inventive disclosures relate facilitating "touchless" user interaction with mobile devices. More specifically, the present concepts relate to integrating optical and/or audio input functions of a mobile device into output functions of the mobile device.

BACKGROUND

Mobile devices occupy an increasingly prominent niche in the evolving marketplace, serving as access points at various stages of conducting a seemingly infinite number of activities. As this trend continues, mobile devices and mobile network capabilities provided thereby are leveraged in an increasing number and breadth of scenarios. Recent examples include the extension of mobile technology to provide a host of financial services such as check deposit, bill payment, account management, etc. In addition, location data gathered via mobile devices are utilized in an increasing number of applications, e.g. to provide targeted advertising, situational awareness, etc.

As the mobile development community finds new utility for devices, users are presented with more numerous, complex, and specific opportunities to provide input required by or advantageous to the underlying process the mobile device is utilized to perform. In addition, the context of the situations in which a user may interact with, or provide input to, a process continues diversifying.

This diversification naturally includes expansion into niches where the implemented technique may not necessarily be the most optimal or even an acceptable approach from the perspective of the user. In a culture where a fraction of a second determines the difference between an acceptable and unacceptable solution to a given challenge, developers seek every possible performance advantage to accomplish superior technology.

For example, several well-known inefficiencies exist with respect to user input received via a mobile device. A first inefficiency is small screen size typical to mobile devices, particularly mobile phones. Since the conventional "smartphone" excludes a physical keyboard and pointer device, relying instead on touchscreen technology, the amount of physical space allocated to a given key on a virtual "keyboard" displayed on the mobile device screen is much smaller than possible for a human finger to accurately and precisely invoke. As a result, typographical errors are common when considering textual user input received via a mobile device.

In order to combat this limitation, typical mobile devices employ powerful predictive analytics and dictionaries to "learn" a given user's input behavior. Based on the predictive model developed, the mobile device is capable of predicting the user's intended input text when the user's actual input corresponds to text that does not fit within defined norms, patterns, etc. The most visible example of utilizing such a predictive analysis and dictionary is embodied in conventional "autocorrect" functionality available with most typical mobile devices.

However, these "autocorrect" approaches are notorious in the mobile community for producing incorrect, or even inappropriate, predictions. While in some contexts these inaccuracies are humorous, the prevalence of erroneous predictions results in miscommunication and errors that frustrate the underlying process, the user, and ultimately defeat the adoption and utility of mobile devices in a wide variety of contexts to which a mobile device could be leveraged for great benefit.

As a result, some developers have turned to alternative sources of input, and techniques for gathering input via a mobile device. For example, most solutions have focused on utilizing audio input as an alternative or supplement to textual input (i.e. tactile input received via a virtual keyboard shown on the mobile device display). In practice, this technique has conventionally been embodied as an integration of speech recognition functionality of the mobile device (e.g. as conferred via a "virtual assistant" such as "Siri" on an APPLE mobile device (iOS 5.0 or higher)).

The illustrative embodiment of this audio input extension being added to a mobile keyboard is demonstrated in the figure depicted below. While this figure displays an interface generated using APPLE's iOS mobile operating system, similar functionality may be found on other platforms such as ANDROID, MICROSOFT SURFACE RT, etc. as well.

Audio input may be received via integrating an extension into the mobile virtual keyboard that facilitates the user providing input other than the typical tactile input received via the mobile device display. In one approach, the audio extension appears as a button depicting a microphone icon or symbol, immediately adjacent the space bar (at left). A user may interact with a field configured to accept textual input, e.g. a field on an online form, PDF, etc. The mobile device leverages the operating system to invoke the mobile virtual keyboard user interface in response to detecting the user's interaction with a field. The user then optionally provides tactile input to enter the desired text, or interacts with the audio extension to invoke an audio input interface. In the art, this technique is commonly known as "speech-to-text" functionality that accepts audio input and converts received audio input into textual information.

Upon invoking the audio input interface, and optionally in response to receiving additional input from the user via the mobile device display (e.g. tapping the audio extension a second time to indicate initiation of audio input), the user provides audio input, which is analyzed by the mobile device speech recognition component, converted into text using a speech-to-text engine, and input into the field with which the user interacted to invoke the mobile virtual keyboard.

Via integration of audio input to the textual input/output capabilities of a mobile device, a user is enabled to input textual information in a hands-free approach that broadens the applicable utility of the device to a whole host of contexts otherwise not possible. For example, a user may generate a text message exclusively using audio input, according to these approaches.

However, speech recognition and audio input capabilities of conventional mobile devices are extremely limited. For instance, as noted above mobile operating systems may conventionally include a "virtual assistant" or analogous function capable of receiving audio input, processing the audio input, and performing a predetermined set of "basic" tasks. Basic tasks include those such as invoking core OS functions, applications, etc. (e.g. launching a browser application included with the OS, performing an internet search using the browser, querying mobile device hardware for relevant data such as GPS location, device orientation, time, etc.).

These virtual assistant and analogous conventional functions are not capable of processing audio input in a specialized context beyond the general, basic functionalities included with the OS. For example, a virtual assistant is adept at performing internet searches, querying mobile device components, and providing predetermined responses to predefined queries, but is not generally capable of performing functions of a third-party application installed on the mobile device. Typically, this limitation arises because the virtual assistant is not configured to integrate with (or even aware of) the third party application's functionality and mechanisms for accomplishing that functionality.

Other conventional techniques exist for facilitating a machine's comprehension of human language. In particular, natural language processing (NLP) techniques exist which enable much broader machine intelligence with respect to linguistic audio input. NLP techniques are vastly superior to conventional mobile technology (e.g. virtual assistants as described above) in terms of being capable of a broad comprehension of linguistic audio input even absent prior instruction, training, etc. Indeed, some virtual assistants employ NLP techniques to improve the mobile OS audio processing capabilities.

However, the application/addition of NLP techniques to existing audio input processing and responsive functionality remain limited in scope and application to generic, common exchanges of information and "native" operating system functionality. A major source of complication and difficulty for enabling more specific and situationally-appropriate functions using audio arises from difficulty in determining context. The same word may have different meaning depending entirely upon the circumstances in which it is employed, and this meaning may not be discernable from the content of the statement alone. Accordingly, it is difficult or impossible to develop accurate, reliable audio processing capabilities without the capability to glean appropriate contextual information in addition to the content of the audio.

While certain virtual assistants such as SIRI®, CORTANA®, etc. generally provide speech recognition functionality, and may be used to invoke and/or interface with native functions of a host device and/or operating system such as querying search engines, location information, etc., to date no known generic (i.e. domain independent) NLP or mobile audio processing techniques specifically address the problem of facilitating a user navigating a mobile application and extracting information, less still a mobile application configured to perform data capture, processing, extraction, and subsequent business workflow integration functions.

Such applications would advantageously avoid the common problems associated with tactile input via mobile devices, as well as improve the overall user experience by reducing workload and frustration for the user. The resulting business advantages to customer retention and engagement make audio input an attractive but challenging approach to addressing shortfalls of conventional tactile input techniques and technologies. However, due at least in part to the challenges mentioned above, no such solution is presently available.

Therefore, it would be highly beneficial to provide new methods, systems and/or computer program product technologies configured to supplement and/or replace tactile input as a mechanism for receiving user input and navigating a mobile application, especially a mobile application configured to perform data capture, processing, extraction, and subsequent business workflow integration functions.

SUMMARY OF THE INVENTION

In one embodiment, a computer-implemented method includes invoking a mobile application using a mobile device; receiving auditory input via the mobile device; and performing a business workflow via the mobile application based on the auditory input.

In another embodiment, a computer program product includes a computer readable medium having computer readable/executable program instructions embodied therewith, the program instructions being configured to cause a mobile device to invoke a mobile application using the mobile device, receive auditory input via the mobile device, and perform a business workflow via the mobile application based on the auditory input.

In yet another embodiment, a system includes a processor and logic executable by and/or integrated with the processor, the logic being configured to cause the processor, upon execution thereof, to invoke a mobile application using a mobile device, receive auditory input via the mobile device, and perform a business workflow via the mobile application based on the auditory input.

Other aspects of the presently disclosed inventive concepts will become apparent from reading the following disclosures. The foregoing embodiments are not to be considered limiting on the scope of the inventive concepts described herein, but are offered by way of example to illustrate several aspects of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

As discussed herein, the term "speech recognition" is to be considered equivalent to, or encompassing, the so-called "speech-to-text" functionality provided with some mobile devices (again, e.g. "Siri") that enables conversion of audio input to textual output. By contrast, the inventive techniques discussed herein may be referred to as "image-to-text" or "video-to-text" functionality.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may optionally utilize and/or include any of the functionalities disclosed in related U.S. Pat. No. 8,855,375, filed Jan. 11, 2013, U.S. Pat. No. 8,855,425, filed Jul. 22, 2013; U.S. Pat. No. 9,355,312, filed Mar. 13, 2013; U.S. Pat. No. 9,311,531, filed Mar. 13, 2014; U.S. Pat. No. 8,885,229, filed May 2, 2014; U.S. Pat. No. 9,058,580, filed Mar. 19, 2014, and U.S. Pat. No. 9,349,046, filed Apr. 14, 2015.

Each of the foregoing patent applications are herein incorporated by reference. For example, in several illustrative embodiments it may be advantageous to classify a document from which textual information is to be obtained, to perform data extraction on a document, to validate a document or information extracted from a document, to subject image data to additional processing (e.g. to improve image quality) before during or after the capture operation, etc. as would be understood by one having ordinary skill in the art upon reading the present descriptions.

Digital images suitable for processing according to the presently disclosed algorithms may be subjected to any image processing operations disclosed in the aforementioned patent application, such as page detection, rectangularization, detection of uneven illumination, illumination normalization, resolution estimation, blur detection, classification, data extraction, document validation, etc.

In more approaches, the presently disclosed methods, systems, and/or computer program products may be utilized with, implemented in, and/or include one or more user interfaces configured to facilitate performing any functionality disclosed herein and/or in the aforementioned related patent application, such as an image processing mobile application, a case management application, a classification application, and/or a data extraction application, in multiple embodiments.

In still more approaches, the presently disclosed systems, methods and/or computer program products may be advantageously applied to one or more of the use methodologies and/or scenarios disclosed in the aforementioned related patent application, among others that would be appreciated by one having ordinary skill in the art upon reading these descriptions.

It will further be appreciated that embodiments presented herein may be provided in the form of a service deployed on behalf of a customer to offer service on demand.

Figure 1:
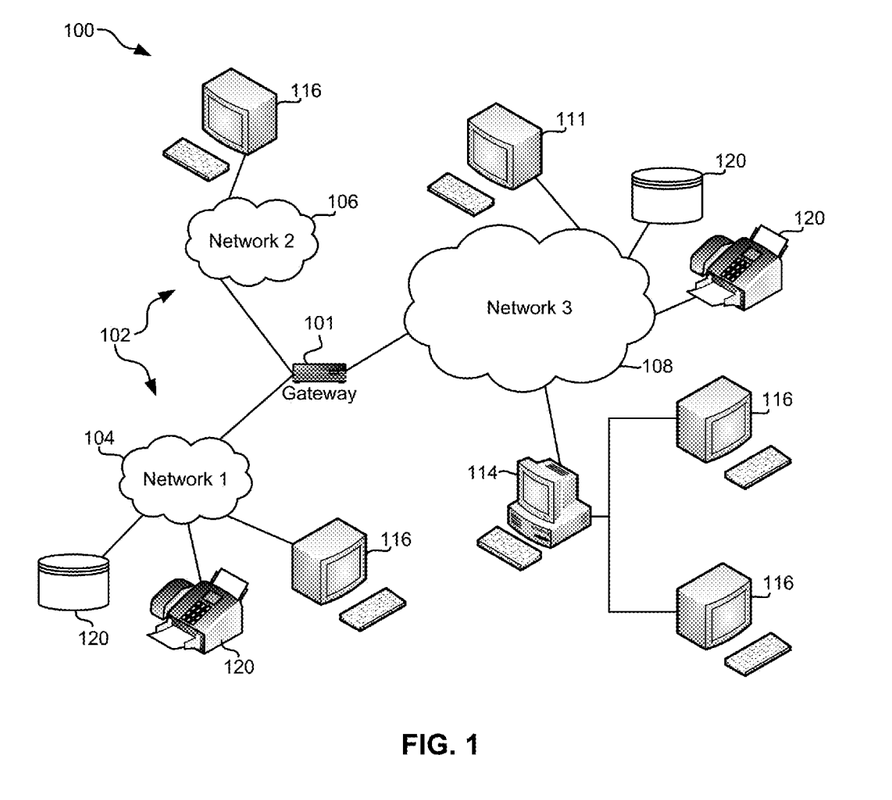
FIG. 1 illustrates a network architecture, in accordance with one embodiment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
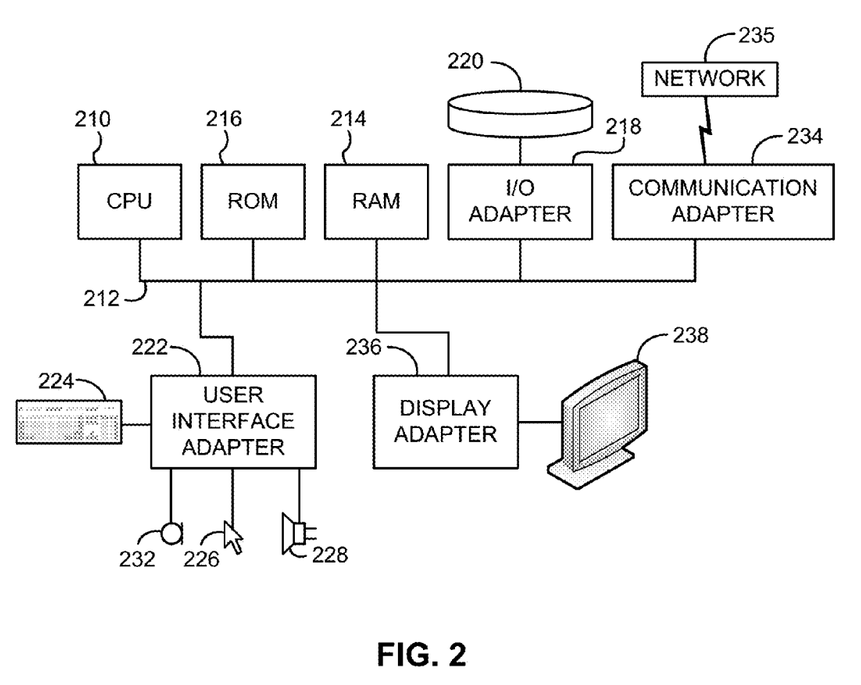
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Touchless Mobile Workflows

The presently disclosed inventive concepts concern the integration of audio input into the I/O capabilities of a mobile device in an intelligent manner that facilitates accurate and facile input of textual information. The exemplary scenarios in which these concepts will be most applicable include inputting textual information to a document, form, web page, etc. as would be understood by one having ordinary skill in the art upon reading the present specification. Beneficially, the presently disclosed techniques accomplish input of textual information without suffering from the inherent disadvantages of utilizing tactile input (e.g. inaccurate input due to small "key" size, improper "correction" using a predictive dictionary or "autocorrect" function, etc.).

Most notably, the present techniques provide superior performance and convenience to the user. Superior performance includes features such as improved accuracy and reduced input time (especially where the optical input depicts information suitable for use in multiple contexts or fields) of providing textual input via the mobile device. In part, the performance benefits are due to the inventive approach disclosed herein being configured to capture, analyze, and provide textual information from optical input without relying on tactile feedback from the user. As a result, these techniques are free from the disadvantages common to an input interface that utilizes a miniaturized virtual keyboard as described above.

Simultaneously, the present techniques offer superior performance over existing integrations of audio input for use in combination with textual input. For example, with reference to the conventional scenario described above involving composition and dispatch of a message including both textual input and audio input, the present techniques advantageously integrate the audio input capabilities of the mobile device with textual I/O such that a user need not provide tactile input to convey textual information.

Moreover, the audio input may be captured, analyzed and converted to textual information in a context-dependent manner Context-dependent invocation, capture and analysis of audio input will be discussed in further detail below.

Integration of Audio Input into Business Workflow Mobile Applications

In general, the presently disclosed inventive concepts integrate audio input capabilities and functionality with mobile applications configured to facilitate business workflows of any suitable type. Preferred embodiments leverage NLP technology to parse audio input into meaningful information in the context of the particular business workflow and/or mobile application.

A generic mobile application as envisioned within the scope of the present disclosures includes one or more user interfaces generally configured to present information to, and receive information from, a user (via the mobile device upon which the application is running) and one or more remote resources, such as a server or network hosting services upon which the workflow and/or mobile application rely, one or more data sources including additional information upon which the workflow and/or mobile application rely, etc. as would be understood by a person having ordinary skill in the art upon reading the present descriptions.

Exemplary, non-limiting user interfaces may include any suitable type of user interface, and may be configured to present and/or receive any type of information suitable in the context of the user interface. For example, a mobile application may include an authentication interface configured to provide secure access to services and/or information provided via the mobile application, one or more input interfaces configured to receive user input relating to the business workflow (e.g. a fillable form interface), a capture interface configured to facilitate capturing optical and/or audio input using the mobile device, etc. as would be understood by skilled artisans reading the present descriptions.

In conventional mobile applications, the mobile device display serves as the primary (if not exclusive) medium for receiving user input. Most typically, the user input is provided in the form of tactile input, i.e. a user "taps," "swipes," or otherwise provides input by performing one or more "gestures" directly on the device display. The mobile application interprets these gestures to provide meaning in the context of the underlying workflow. For example, gestures may be as simple as "clicking" on a field and keys of a virtual keyboard by tapping on the appropriate regions of the mobile display in an appropriate pattern or sequence to enter biographical, financial, etc. information necessary to perform the business workflow.

The user may also navigate between interfaces, typically using navigation "buttons" such as a "back" and "forward" button presented to the user via the mobile device. Alternatively, the application may automatically or semi-automatically follow a predetermined sequence to navigate throughout the various user interfaces employed to facilitate the business workflow.

A user may capture image data via a capture interface, which may substantially represent a "camera" interface native to the mobile device OS, or a separate viewfindertype interface that enables capturing optical input using the mobile device optical sensor(s). These conventional capture interfaces generally require a user to manually position the device in proximity to the subject of the capture operation, and invoke the capture, e.g. by tapping a "take photo" or "start video" button presented via the mobile device display.

In all the above conventional scenarios, the user must provide tactile input to the mobile application to navigate through the various interfaces thereof, as well as to provide information necessary to perform the business workflow (whether directly or via an intermediate capture operation). The conventional mobile application and workflow may require additional input to correct or supplement erroneous or missing information. These interactions between the user and the device undesirably add significant time and effort to the process of performing the business workflow via the mobile application.

Accordingly, the presently disclosed inventive concepts minimize, or preferably avoid entirely, the need for a user to provide tactile input via the mobile device display. As a substitute, the inventive mobile applications and associated workflows leverage audio input and output to usher the user throughout the workflow process, as well as acquire, process, curate, etc. any information necessary to perform the business workflow.

For instance, and according to one generic embodiment, a mobile application configured to facilitate performing a business workflow using audio input may exclude the capability to receive tactile input. Preferably, however, tactile input is permitted as a redundant option in the event audio and/or optical input cannot be provided or are inadequate to perform the underlying workflow and/or mobile application functionality.

A user may invoke the mobile application via the mobile device OS using tactile input, e.g. by tapping on an icon representing the mobile application, or may invoke the mobile application via audio input, e.g. by issuing a verbal command to the mobile OS virtual assistant. In preferred approaches, the mobile application may be contextually invoked, e.g. in response to determining the mobile device is in proximity to a predetermined location and/or in response to detecting predetermined auditory and/or optical input, such as a user-spoken command or a particular document being placed within view of the mobile device optical sensors.

Context-dependent process invocation is discussed further in related U.S. Pat. No. 9,349,046, filed Apr. 14, 2015. According to various embodiments, the present disclosures should be understood to encompass all such context-dependent process invocation functionality disclosed in U.S. Pat. No. 9,349,046.

Upon invoking the mobile application, the user preferably need not provide any tactile input to perform the underlying business workflow, but instead receives from and provides to the mobile device audio feedback. For instance, a touchless mobile application may implement its own specialized "virtual assistant" to guide the user throughout the necessary steps of the business workflow.

The application may initially inquire as to the particular type of workflow the user wishes to perform. Upon receiving the user's instruction regarding the appropriate workflow, the mobile application may proceed to collect information from the user via interactions substantially representing a conversation between two humans. To this end, the mobile application preferably employs a virtual assistant or similar functionality that utilizes NLP technology.

For example, the application may request the user provide information necessary to perform the business workflow via a series of questions to which the user may provide verbal responses.

In more embodiments, information provided by the user to the mobile application may be utilized by the business workflow to configure, design, or generate a dialog system or conversational agent. The dialog system/conversational agent my serve as the virtual assistant and/or facilitate the virtual assistant utilizing NLP technology and/or performing speech recognition tasks within the context of the business workflow, according to various embodiments.

For instance, the user may define a language in which speech recognition and NLP tasks should be performed, may train the dialog system/conversational agent in various languages to improve speech recognition, may define acceptable or unacceptable responses to various requests for information that may be conducted throughout the business workflow, etc. as will be appreciated by a person having ordinary skill in the art upon reading the present disclosures. Additionally and/or alternatively, training may occur naturally over time as users utilize the mobile application to perform business workflows, such that for example a speech recognition function of the mobile application may feature improved recognition of a particular user's voice, of a particular language, etc. In some embodiments, training may also improve intent recognition features, e.g. by associating particular inputs such as certain phrases, terms, images, etc. and/or combinations thereof with performing a particular workflow or operation within a particular workflow. Intent recognition will be discussed in further detail below, according to several illustrative embodiments.

In still more embodiments, a user may not know or recall information necessary to the workflow, in which case the user may indicate lack of knowledge in a verbal response, causing the virtual assistant to preferably suggest alternative sources of information. For example, the virtual assistant may request a different piece of information the mobile application may utilize to retrieve the necessary, unknown information (e.g. request a social security number to retrieve tax information from an IRS database).

Additionally and/or alternatively, the virtual assistant may request the user present a document or image that is known or likely to depict the necessary information or information suitable to retrieve the necessary information. For instance, a user may define a language to be utilized for NLP and speech recognition by imaging a document depicting text in the particular language, or naming the particular language. In more instances a user may provide biographical information by presenting an image of an identity document such as a driver license, passport, insurance card, etc.; may provide financial information by presenting an image of a financial document such as a check, credit/debit card, etc.; may provide product information by presenting an image of a product or product identifier, e.g. a serial number, vehicle identification number, barcode, model number, etc.; biometric or medical information by presenting an image of the user, e.g. a portrait or profile; or provide any other suitable type of information via presenting a document or image depicting the necessary information. Accordingly, the virtual assistant may request the user present or image any of the foregoing documents, objects, etc. in the course of performing the business workflow.

Further still, the virtual assistant may request permission to access restricted or secured information available to the mobile device (e.g. a database requiring administrator access or other authentication and containing necessary information or information suitable to retrieve necessary information, such as an account name and password).

In some approaches, the virtual assistant may request the user provide necessary information via tactile input. Again, while tactile input may be an acceptable form of input in the event no other input is suitable (e.g. a user does not know, recall, or possess documents depicting necessary information), in preferred embodiments tactile input is excluded from the presently disclosed mobile application functions.

In any event, the mobile application preferably receives from the user either the information necessary to perform the workflow, or information suitable to retrieve such necessary information, and more preferably does so via issuing a plurality of verbal requests and/or instructions to the user, and receiving in turn a plurality of verbal responses and/or instructions, optionally supplemented by optical input in some instances.

Upon receiving information from the user, retrieving information from another source, extracting information from optical input, etc. the application may verify or validate the received information. Preferably, this is accomplished by a verbal request for verification, i.e. the mobile application "reads back" the received information and requests user affirmation, negation, or modification thereof.

In preferred embodiments, where verification indicates that the received information is incorrect, and requires negation or modification, the negation and/or modification may be achieved via receiving further audio input from the user. Additionally and/or alternatively, optical input may be provided to modify and/or negate the received information. Optical input may be received, processed, and leveraged in any manner described in related U.S. Pat. No. 9,349,046.

Similarly, the mobile application may request the user provide and/or verify ancillary information useful to performing the workflow, e.g. identify a type of document being captured in the course of performing the workflow, a type or format of information provided by verbal response, a context for the information (e.g. a year to which tax information corresponds, a source from which information were obtained, a form or format of information such as "Last, First" for name information, etc. as would be understood by a person having ordinary skill in the art upon reading the present descriptions. The ancillary information is not necessary to perform the workflow, but may significantly accelerate or ease the process of accomplishing the objective of the workflow.

For example, a workflow may require certain information, and expect that the information be provided in a particular form. However, in some scenarios the information may only be available in another form (e.g. two different formats of dates, two different currency amounts, in two different languages, etc.). Accordingly, the workflow may benefit from associating ancillary information with the necessary information, particularly where the ancillary information may indicate the discrepancy between the expected form and provided form of information. In this manner, the workflow need not determine whether or to what extent the discrepancy exists based on analyzing the provided information. Rather, the workflow may leverage the ancillary information to quickly and easily convert the provided information into a suitable form (preferably the expected form) directly.

Upon receiving and verifying all (or at least sufficient) information necessary to perform the business workflow, the mobile application virtual assistant may submit the information to the workflow for processing, and may optionally request user affirmation of the submission prior to submitting the information.

In addition, at any point a user may navigate throughout various interfaces, functionalities, etc. of the mobile application and/or underlying business workflow using audio input. Preferably, the mobile application includes a plurality of "default commands" dedicated to facilitating audio-based navigation throughout the interfaces and invocation of the various functionalities. Common examples include any navigation action, such as "forward," "back," "refresh," "cancel," etc. as well as common input actions, e.g. "delete," "undo," "enter," etc. as would be understood by a person having ordinary skill in the art upon reading the present descriptions.

Of course, these general navigation and input functionalities may be supplemented by any number and type of appropriate commands within the context of the particular business workflow. Similarly, while the above generic scenario contemplates a conversational exchange between the user and the mobile application via verbal communication, other embodiments may reflect a one-sided conversation in that the user is the only entity providing audio input. In such embodiments, the requests, instructions, verifications, etc. may be displayed directly on the mobile device rather than "read aloud."

Context-Dependent Touchless Workflow Functionality

The foregoing general concepts will now be presented in the context of a loan application process to demonstrate (i) specific implementation in a real-world context; and (ii) context-dependent functionality that advantageously streamlines and improves the user experience with respect to data input. While a loan application is described as the exemplary context in which to apply the presently disclosed inventive concepts, those having ordinary skill in the art will appreciate that the invention described herein is applicable to a wide variety of other contexts, particularly contexts involving applying for services and/or entitlements, financial transactions, account management, customer/client on-boarding, image processing per se, and/or any other context as disclosed in the related patents incorporated hereinabove by reference or as would be appreciated as suitable by a skilled artisan after reading these descriptions.

It will be further understood that intention recognition may be correspondingly applicable to each of these contexts, and may involve training the mobile application based on associating different types of inputs with invoking or performing appropriate business workflows and/or operations thereof within the particular context.

Returning now to the exemplary loan application process, in one embodiment a user invokes a mobile application configured to facilitate applying for a loan. Upon invoking the application, the user is presented with an authentication interface via the mobile device display. The authentication interface requires a username and passkey. To avoid tactile input but retain security, the authentication interface may employ a virtual assistant or other interactive feature to request the user provide the username via audio input, but not speak the passkey aloud. Rather, in preferred embodiments the passkey may comprise a non-audible component, such as a unique image, pattern, etc. previously designated by the user. The mobile application may present a non-audible component selected from among a bank of non-audible components including the user's passkey via the mobile device display, and request the user affirm or negate the propriety of the displayed non-audible component as the user's passkey. Based at least in response to a correct affirmation of the passkey, the user is granted access to the mobile application.

Of course, additional and/or alternative authentication techniques such as password-based login, biometric authentication, human/nonhuman authentication techniques (e.g. CAPTCHA™) may be employed without departing from the scope of the present disclosures. For instance, in preferred approaches biometric authentication may include voice print recognition, facial recognition, fingerprint recognition, iris pattern recognition, etc. as would be understood by one having ordinary skill in the art upon reading the present descriptions. In particularly preferred embodiments, authentication may be provided via audio input alone using speech recognition technology. Details of biometric authentication are beyond the scope of the present disclosures, and the presently described inventive concepts should be understood as encompassing any known biometric authentication technique, particularly those based on authenticating auditory input.

As will be appreciated by persons having ordinary skill in the art upon reading the present descriptions, an audio-based authentication regime such as described above advantageously avoids the need for tactile input in preferred embodiments. However, it will also become apparent that a user speaking aloud sensitive information such as an alphanumeric password may be undesirable in certain circumstances, e.g. public places. Accordingly, the present disclosures fully encompass any suitable authentication technique, utilizing one or more of tactile input, optical input, and auditory input, in various embodiments. Preferred embodiments, however, avoid tactile input while also maintaining security of the sensitive information.

Upon authentication, a virtual assistant may be displayed via the mobile device to visually and/or verbally request instruction from the user regarding a type of workflow the user desires to perform. Preferably, the request is verbal, and the user provides a verbal selection of the desired workflow by stating a name or objective of the workflow.

Importantly, due to advantages of NLP technology, the user need not respond in any formulaic manner or with any particular phrase or keyword. While greater specificity and consistency will enhance the speed and efficiency of the workflow performance, such precision is not necessary to accomplish the advantageous aspects of the presently disclosed inventive concepts. Accordingly, skilled artisans reading the present disclosures will appreciate that the inventive concepts presented herein include the use of intention recognition, which may be performed using the virtual assistant and/or dialog system/conversational agent. Recognizing user intention may be facilitated via training a particular workflow to associate specific terms and/or phrases with invoking particular workflows and/or performing particular aspects of workflows. Several exemplary embodiments of intention recognition are described in further detail below.

For example, in one embodiment a user desires to apply for a loan. The user may, in reply to a request for identification of desired workflow, state "I need some money," "I need to borrow some money," "I need a loan quote," and/or "I would like to apply for a loan from bank X," etc. in increasing order of specificity. All these responses would be sufficient to invoke a loan application workflow, though the less specific responses may require additional input before arriving at that conclusion (e.g. inquiring whether the user wishes to make a transfer between bank accounts, apply for a credit card, or file a mortgage application in response to a user's statement "I need some money").

The user indicates verbally that a loan application is the desired workflow, in response to which the virtual assistant preferably provides a confirmation (e.g. "Okay, let's get started with your loan application") to the user. Subsequently, the virtual assistant proceeds to solicit the workflow-necessary information from the user.

Since a loan application is a somewhat standardized process with respect to the type of information needed to reach a conclusion, the virtual assistant may alternatively proceed to solicit such information from the user via verbal question and answer, but preferably first solicits such information from the user in the form of a document likely to depict some or all of the necessary information (and/or information suitable to retrieve the necessary information). Frequently, documents appropriate for this purpose include identifying documents such as a driver's license, social security card, birth certificate, passport, employee identification, health insurance card, etc. as would be understood by a person having ordinary skill in the art upon reading the present descriptions.

The mobile application may solicit the information via the virtual assistant first asking if the user has in his or her possession a suitable document via verbal inquiry. If the user replies in the affirmative, the virtual assistant may instruct the user to place the document under favorable imaging circumstances (e.g. good lighting, flat, level surface, high contrast between background and document, etc.) and direct/assist the user in capturing an image of the document.

Any suitable image capture and/or image processing techniques may be utilized, and in preferred embodiments image capture techniques such as disclosed in related U.S. Pat. No. 8,855,375, filed Jan. 11, 2013, U.S. Pat. No. 8,855,425, filed Jul. 22, 2013; U.S. Pat. No. 9,355,312, filed Mar. 13, 2013; U.S. Pat. No. 9,311,531, Filed Mar. 13, 2014; U.S. Pat. No. 8,885,229, filed May 2, 2014; U.S. Pat. No. 9,058,580, filed Mar. 19, 2014; and/or U.S. Pat. No. 9,349,046, filed Apr. 14, 2015.

If more than one type of document is suitable, the virtual assistant may optionally request the user identify the specific type of document being imaged. In this manner, the workflow may leverage the superior human ability to discriminate between different types of objects and avoid computationally expensive and less-accurate machine classification techniques. If no document type is specified by the user, the mobile application may determine the document type using a classification functionality such as described in the related patent applications cited above.

Post capture (and optionally, post processing to improve image quality), necessary and/or ancillary information are extracted from the provided document. In the exemplary loan application scenario, the user provided a driver's license and the workflow was able to extract therefrom an applicant name, address, driver's license number, and date of birth. While each of these pieces of information are necessary to the loan application, they are not sufficient to complete the workflow process.

Accordingly, the virtual assistant may inform the user of the pieces of information that were successfully obtained from the document, and optionally may request the user provide the additional information necessary but not yet obtained, and/or request permission from the user to attempt to retrieve the additional information using information obtained from the driver's license. For example, the workflow needs to know the user's adjusted gross income (AGI) for the previous year.

If known, the user may provide this information directly via verbal response. In the more likely scenario, the user does not know her AGI by rote. The user may indicate this lack of knowledge in reply to a request for the user's AGI, in which case the virtual assistant may subsequently request user permission to attempt retrieving the user's AGI from a third party data source, such as the IRS. Upon receiving user permission, the workflow may interface with the third party data source and retrieve the additional necessary information using some or all of the information obtained from the driver's license as a query.

Upon locating the additional necessary information, the virtual assistant indicates success to the user, and requests verbal affirmation, negation, or modification of the retrieved additional information. In our loan application example, the user confirms her AGI.

This process may proceed until all necessary information is obtained, from one or more documents, user responses, third party sources, etc. Upon obtaining all necessary information, the mobile application assembles the necessary information for submission and review. Prior to submitting the assembled information, the virtual assistant may request the user "finalize" the submission by verifying accuracy of all assembled information. Upon finalization, the mobile application submits the finalized information for processing.

Alternatively, if the user notices an error or omission, the user may indicate directly the erroneous piece of information and/or provide a correction in a verbal instruction to the virtual assistant. In more embodiments, the user may navigate to a previous interface (e.g. an interface via which the erroneous information was input) to repeat or correct the input process and provide the appropriate information.

In particularly preferred embodiments, information from multiple modalities (i.e. types of input and/or processing schemes) may be used to correct information. For instance, in one approach a user provides audio input and optical input from which workflow-necessary information are determined/extracted. The user provides workflow-necessary information in response to a prompt from the mobile application, e.g. the user speaks aloud the user's full legal name. The mobile application imperfectly recognizes the audio input, e.g. because the user has a heavy accent and/or the name is foreign to the recognition (e.g. NLP) engine. Accordingly, in some embodiments the presently disclosed inventive mobile application may include a multimodal user interface, e.g. to receive multimodal inputs.

The user also provides optical input representing a document (e.g. driver's license) depicting the user's name, and extraction is performed to deduce the user's name from the optical input. The extraction process imperfectly recognizes at least some information depicted in the optical input, e.g. made a couple of OCR errors in the Name field due to a user's name depicting unrecognized symbols such as accent symbols. In this embodiment, the results from the audio recognition and the optical extraction may be advantageously combined to produce an ultimate result with higher confidence.

Input may be similarly combined from multiple instances of one or more modalities. For example, a user may provide optical input as above, and extraction may be similarly imperfect. Instead of supplementing with audio input, the mobile application may prompt the user to capture additional optical input. For instance, the user may be directed to capture a second image (preferably by simply hovering the mobile device optical sensor over the desired subject of capture) of the previously captured document, and/or an image of a different document also depicting the workflow-necessary information. The extraction process may be repeated for the second image, and results of the several extractions can be used to improve extraction accuracy as a whole.

In the context of audio input, a user may be prompted to repeat a previously provided statement, and/or reformulate the previous statement. For example, with respect to a name, the user may be prompted first to provide the full legal name, and in a second audio capture iteration may be prompted to provide only the first and last name, an abbreviated version of the full legal name, a title, etc. as would be understood by a person having ordinary skill in the art upon reading the present descriptions.

Of course, though not preferred, audio input, optical input, and tactile input may also be negated and/or modified based on tactile input from the user, without departing from the scope of the present inventive concepts. Such embodiments are particularly advantageous as an alternative input option to address situations where audio and optical input are both unsuitable, e.g. in a loud area with poor lighting conditions such as an airplane or other public transportation, certain public or corporate events such as conferences, social gatherings, etc.

All of the foregoing functionality is achievable and preferably accomplished via exclusive use of optical and audio input/output between the mobile device and the user. In this manner, the presently disclosed inventive concepts avoid the traditional fallbacks of tactile input and streamline the user experience.

Figure 3:
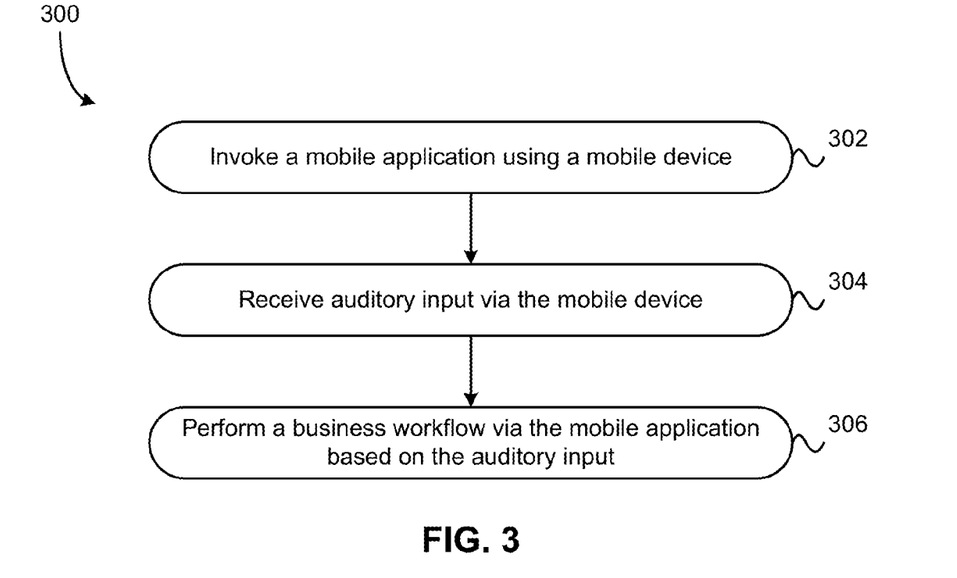
FIG. 3 is a flowchart of a method for performing touchless mobile workflows, according to one embodiment.

Now referring to FIG. 3, a flowchart of a method 300 for performing touchless mobile workflows is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a mobile device that may optionally be in communication with a server, or the method 300 may be performed using some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), a graphics processing unit (GPU), an application specific integrated circuit (ASIC), a field programmable gate array (FPGA), etc., combinations thereof, or any other suitable computing device known in the art.

As shown in FIG. 3, method 300 may initiate with operation 302, where a mobile application is invoked using a mobile device. Invoking the mobile application may be accomplished in any suitable manner, and in some embodiments may not be considered part of the "touchless" workflow but rather an operation preceding initiation of the "touchless" workflow performed via method 300. Accordingly, invoking the mobile application may include receiving at the mobile device input from a user, such as tactile input (e.g. a user tapping a mobile application icon on the display of the mobile device), auditory input (e.g. a user instructing the mobile application to launch the mobile application), and/or optical input (e.g. scanning a quick response (QR) code using the mobile device, where the QR code instructs the mobile device to launch the mobile application or direct a mobile web browser to a particular website).

Method 300 also includes operation 304, in which auditory input is received via the mobile device. The auditory input may be received in any suitable manner described herein and/or as would be appreciated by a person having ordinary skill in the art upon reading the present disclosures. Preferably, receiving auditory input includes recording audio using a microphone of the mobile device, retrieving and/or receiving data from a memory of the mobile device or another device with which the mobile device is in communication, etc. Auditory input may be received in response to a prompt displayed to the user, e.g. a visual prompt presented on the mobile device display, and/or an in response to an audible prompt presented to the user, e.g. a virtual assistant "speaking" instructions to the user. Auditory input may be received at various different points throughout the "touchless" mobile workflow, in some approaches.

In operation 306 of method 300, a business workflow is performed via the mobile application and performance of the workflow is based on the auditory input. For instance, in various embodiments the user may provide auditory input to the mobile device and/or audio data (e.g. corresponding to previously captured auditory input) may be provided to or retrieved by the mobile device from e.g. a memory and/or storage medium of the mobile device, a server environment to which the mobile device is communicatively coupled, via a network, etc.).

Performing the business workflow based on the auditory input may include any combination of operations as described herein. Generally, performing the business workflow may include using received auditory input to direct the progression of the workflow, e.g. to decide which of multiple possible paths to take at a branching point of the workflow. Performing the workflow may also involve parsing the auditory input and using some or all information obtained as a result to advance the workflow, e.g. by providing information necessary to accomplish one or more tasks of the workflow such as authentication, validation, etc. as described herein according to various embodiments.

Of course, the method 300 may include any number of additional and/or alternative operations, features, etc. as described herein without departing from the scope of the presently disclosed inventive concepts. In various exemplary embodiments, method 300 may include any combination, permutation, selection, etc. of the following operations and/or features.

In one approach, performing the business workflow excludes receiving any tactile input via the mobile device. Such embodiments reflect a completely "touchless" workflow capable of being performed entirely without any tactile input from the user.

In more embodiments, performing the business workflow comprises: capturing digital image data; receiving auditory input relating to the captured digital image data; and determining a subject of the captured digital image data. For instance, the auditory input may identify the subject of the captured digital image data. In other approaches, the digital image data may be analyzed, e.g. using a classification technique, and auditory input may provide additional information pertinent to the classification process.

Pertinent information may include any feature descriptive of the subject of the captured digital image data, such as object size, object dimensions, object color, which surface/face of the object is depicted in the captured digital image data (e.g. front or back of a document, profile or portrait view of a face, etc.), distance between the object and the camera used to capture the digital image, etc. Pertinent information may additionally and/or alternatively include information descriptive of the image data, e.g. image resolution, color depth, device used to capture the object, flash setting, location where image data were captured, etc.

The foregoing exemplary forms of pertinent information are provided for illustrative purposes, and should not be considered limiting on the scope of "pertinent information" for purposes of image classification. Any other information as disclosed in the related patents mentioned herein (especially U.S. Pat. No. 9,335,112) may be employed in the business workflow without departing from the scope of the presently described inventive concepts.

Accordingly, in some approaches the subject of the captured digital image may be determined based at least in part on the auditory input relating to the captured digital image data.

In more embodiments, performing the business workflow in operation 306 of method 300 may include determining information necessary for performing the business workflow. Determining the necessary information may be based in whole or in part on the subject of the captured digital image data; and/or the auditory input relating to the captured digital image data. Upon determining the necessary information, some or all such information may be obtained by extracting the information necessary for performing the business workflow from the digital image data, receiving necessary information from the user (e.g. in the form of auditory and/or optical input), etc. The necessary information may be present in previously provided auditory and/or optical input, or the workflow may include receiving additional input(s) comprising the necessary information, in various embodiments.

In still more embodiments, necessary information may be retrieved, e.g. from a storage device or memory of the mobile device, a data store to which the mobile device is communicatively coupled, etc. The particular information retrieved may be based in whole or in part on input received via the mobile device, e.g. auditory and/or optical input. For instance, information may be retrieved using information derived from the auditory and/or optical input as a query. Information derived from the auditory and/or optical input may additionally and/or alternatively be utilized to validate information retrieved or received from memory, storage, servers, etc. In one example, information may be retrieved or received from the memory, storage, server, etc. and validated against information derived from auditory and/or optical input prior to providing the retrieved information to the business workflow.

In still more embodiments of method 300, the auditory input received at the mobile device may optionally include ancillary information. Ancillary information may include any suitable type of information described herein, and may optionally but preferably be associated with necessary information (e.g. as metadata associated with the data representing the necessary information) to facilitate performing the business workflow in operation 306.

In several implementations, performing the workflow may result in an ambiguity or partial failure, such as inability to extract necessary information from inputs, poor confidence in a result of performing one or more operations of the workflow (e.g. classification, extraction, parsing, etc.), etc. In such embodiments, the workflow may seek confirmation, modification, or negation of the ambiguous result, partial failure, etc. or may seek express instructions for a user regarding how to handle the challenge. Accordingly, it is useful for auditory input to include a user affirmation, a user negation, and/or a user modification of necessary information, ancillary information, etc. in some approaches.

User affirmation, negation, and/or modification may also be leveraged to facilitate validating information necessary to perform the business workflow of operation 306, in some approaches.

Turning to other embodiments of method 300, in some approaches performing the business workflow in operation 306 may include parsing the auditory input; determining information necessary to perform the business workflow based on the result of the parsing process; and selectively providing the necessary information to the business workflow. Such embodiments are advantageously capable of distinguishing necessary from unnecessary information within the inputs provided to the workflow, particularly in auditory inputs, and only providing the necessary information so as to avoid improper actions in the course of performing the workflow.

As will be appreciated upon reading the instant disclosures, the parsing may involve any suitable technique for parsing auditory and/or optical inputs, and in the case of auditory inputs preferably includes parsing based on NLP techniques.

In some embodiments, parsing may imperfectly determine the information, necessary, ancillary or otherwise, from the input(s). In such embodiments, to perform the business workflow, the method 300 may include receiving additional auditory input via the mobile device (e.g. a repetition of the prior auditory input, or different auditory input such as a different manner of expressing the same information); parsing the additional auditory input; determining the information necessary to perform the business workflow from the additional auditory input; comparing the information necessary to perform the business workflow as determined from (i) the auditory input; and (ii) the additional auditory input; and perfecting the information necessary to perform the business workflow based on the comparison. For instance, perfecting the information may include determining a consensus from the information derived from the auditory input and the additional auditory input, and providing the consensus information to the workflow.

In even further embodiments, optical information may be helpful to supplement and/or resolve imperfect parsing results. Accordingly, method 300 may optionally include receiving optical input via the mobile device; extracting the information necessary to perform the business workflow from the optical input; comparing the information necessary to perform the business workflow as determined from the auditory input with the information necessary to perform the business workflow as extracted from the optical input; and perfecting the information necessary to perform the business workflow based on the comparison.

As referenced above, in various embodiments auditory input may be received in response to an instruction or request presented to the user, e.g. via a virtual assistant of the mobile device. In such embodiments, the instruction or request may expressly request a particular form of input, and/or identify the particular information needed by the workflow and allow the user to determine the appropriate input(s) to provide such information. The instruction or request may be generated via the mobile device, in one implementation, and may do so using a text-to-speech engine.

While several exemplary scenarios have been set forth above to illustrate the concepts and features of the inventive subject matter disclosed herein, those having ordinary skill in the art will appreciate that these concepts are equally applicable to any number of similar scenarios, implementations, practical applications, etc. For instance, while some examples described herein may have been presented from the perspective of a user interacting with a web page and desiring to input textual information depicted on a document into a fillable field of that web page, the inventive subject matter discussed above is equally applicable to any similar or equivalent scenario that would be appreciated by skilled artisans reading these disclosures. For example, the present subject matter may be equally applied to any situation involving a user inputting textual information via a virtual keyboard user interface, such as a user composing an email, interacting with an application, etc.

While the present descriptions have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein.

Figure 4:
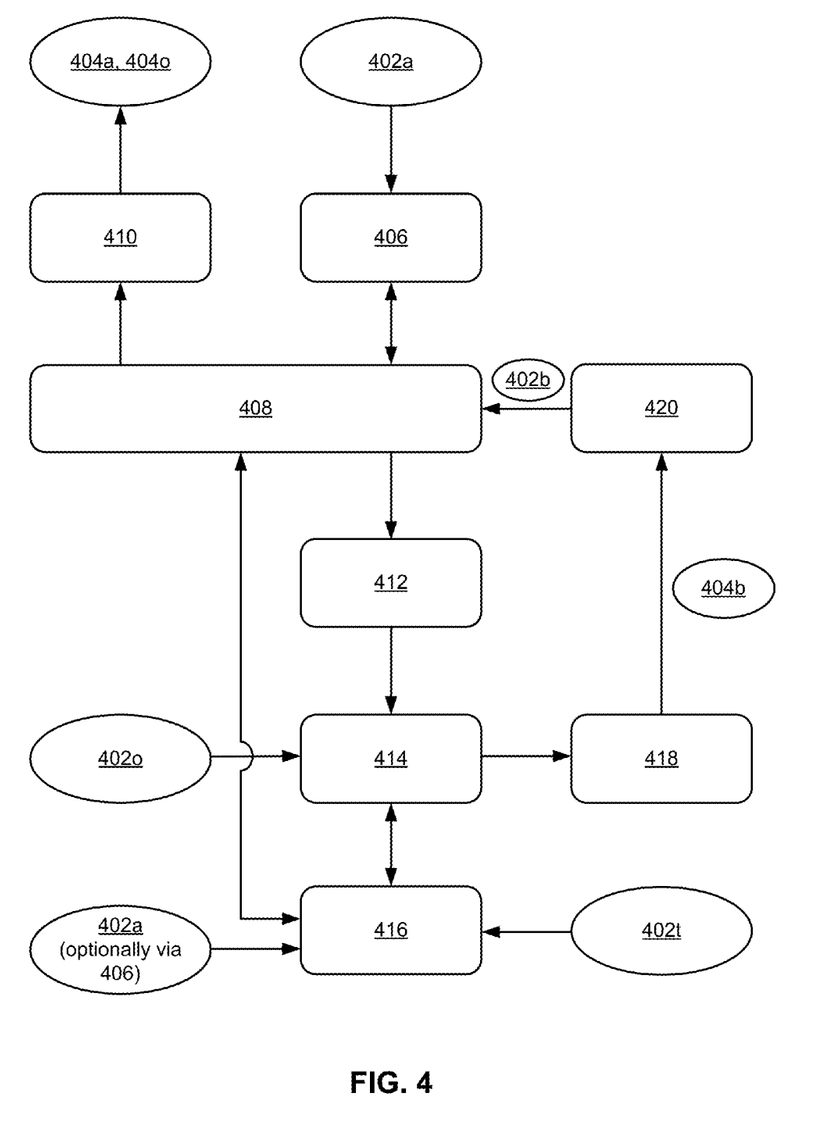
FIG. 4 is a simplified schematic of a system configured to provide touchless, context-dependent input processing for integration with business workflows, in accordance with one embodiment.

In accordance with one exemplary embodiment, an appropriate system architecture 400 is shown in FIG. 4, the architecture 400 being configured to receive and/or provide inputs and/or outputs of any type described herein for the general purpose of facilitating touchless mobile workflows and context-dependent operation/invocation thereof. The architecture 400 preferably includes components comprising a plurality of modules, nodes, functions, etc. as would be understood by a person having ordinary skill in the art, the components being configured to perform the various operations described herein. In particularly preferred embodiments, the architecture 400 is part of a mobile application configured to provide touchless input processing capabilities to a business workflow.

In the illustrative embodiment represented by FIG. 4, the architecture 400 is configured to receive inputs such as auditory input 402a, optical input 402o, tactile input 402t, and/or business workflow input 402b, as well as being configured to provide corresponding auditory, optical, and/or business workflow outputs 404a, 404o, and/or 404b in any combination or permutation depending on the context of the particular use of the system, the workflow, etc.

In various embodiments, and as generally described elsewhere herein, auditory input 402a generally includes spoken information, but may include other forms of audio such as sounds that are not part of a spoken language. Similarly, auditory output 404a should be understood as including any type and/or format of audio information that may be presented to a user using a suitable device as described herein, preferably a mobile device. Auditory output 404a may include auditory translations of textual information, e.g. textual information provided by the user to the architecture 400

In more embodiments, optical input 402o may include any suitable form of optical information, such as image data, video, or other input comprising or derived from optical signals. Tactile input 402t may include any type of input derived from or comprising signals received via a user's tactile interaction with a device, most commonly tapping on a screen displaying a virtual keyboard or other GUI, or depressing keys of a mobile device keyboard.

Business workflow input 402b may be understood to generally include any type of information that may be provided to the touchless-enabling front end of a mobile application as shown in FIG. 4 and described herein. For instance, business workflow input 402b may include requests for information needed by the business workflow, may define or provide contextual information to the architecture 400, may include requests for user confirmation/negation/modification of information provided to and/or retrieved by the business workflow, or any other suitable type of information that may be exchanged between a business workflow and a mobile application providing touchless input processing capability to such workflow, as described herein and as would be understood by a person having ordinary skill in the art upon reading the present descriptions.

The components 406-420 of the architecture 400 are configured to receive such inputs and/or provide such outputs to other components 406-420 of the architecture 400, as well as to receive such inputs and/or provide such outputs to and from sources external to the architecture, such as a server environment (e.g. as depicted in FIG. 1) which may provide added processing functionality, host reference information (e.g. for purposes of validation), etc. in some approaches. The components various components 406-420 of the architecture 400 are also preferably configured to receive inputs from and/or provide inputs to external sources such as components of a mobile device, including a display, microphone, memory, network communication interface, etc. Inputs and/or outputs may also be exchanged among the various components 406-420 of the architecture 400, in more approaches.

With continuing reference to FIG. 4, and in accordance with one operational embodiment of the architecture 400 thereof, auditory input 402a may be received by the architecture 400, preferably at an automatic speech recognition (ASR) and/or natural language processing (NLP) module 406. The auditory input 402a may include any suitable type of information described herein, such as instructions to invoke a mobile application configured to facilitate performing a business workflow in a touchless manner; information necessary to advance a workflow in progress; confirmation, negation, and/or modification of previously provided input and/or information retrieved by the business workflow, etc. without departing from the scope of the present disclosures and according to various embodiments.

Upon receiving the auditory input 402a, ASR/NLP module 406 preferably recognizes and parses any speech represented in the auditory input, and passes the result of such recognition and/or parsing to a context management module 408.

In various embodiments the primary responsibility/function of the context management module 408 is to determine the appropriate context of the inputs and/or outputs received thereby, and direct subsequent processing accordingly. To facilitate this function, context management module 408 may optionally but preferably include a dialog manager or conversation agent such as described hereinabove, including all the functionality thereof. For instance, the context management module 408 may facilitate appropriate processing of terms that may be ambiguous without understanding the context of the workflow, may determine whether particular inputs are to be processed further in the context of providing information to a business workflow, requesting information from a user, verifying/validating information, capturing information in a particular form, etc. as would be appreciated by a person having ordinary skill in the art upon reading the present disclosures.

As such, the ASR/NLP module 406 and context management module 408 should preferably be understood as in two-way communication with one another according to the architecture 400 depicted in FIG. 4. Of course, in other embodiments one-way communication may be employed without departing from the scope of the presently described inventive concepts.

Context management module 408 may also provide contextual information to the ASR/NLP module 406 to facilitate speech recognition and/or language parsing, in some embodiments. In one example, the context management module 408 may identify the language in which auditory input 402a is spoken, an individual who created/provided the auditory input (thereby allowing advantageous use of trained recognition modules, for example), a context-appropriate dictionary or set of parsing rules to facilitate recognizing and/or parsing language that may be specific to a particular application, workflow, etc. as would be understood by a person having ordinary skill in the art upon reading the present descriptions.

Context management module 408 is therefore preferably communicatively coupled to a business workflow module 420, and may receive from the business workflow module 420 business workflow inputs 402b such as the contextual information described hereinabove.

Further, context management module 408 may optionally be in communication with a text-to-speech (TTS) module 410, which in turn may facilitate converting text (e.g. received from a user, workflow, or other source) into audio, or other text (e.g. text in a different language than the language in which the received text was expressed) and outputting such audio or text as auditory and/or optical output 404a, 404o.

For instance, a user may provide auditory input 402a to the architecture 400 via ASR/NLP module 406, such auditory input 402a may be recognized and/or parsed by the ASR/NLP module 406, and the result may be processed by context management module 408. In order to confirm/correct recognition, parsing, and/or contextual processing, the TTS module 410 may convert the result of the recognition, parsing, and/or contextual processing to auditory output 404a (e.g. spoken version of the result) and/or optical output 404o (e.g. an image of the result, or the textual rendition of the result) for presentation to a user and/or validation system.

Additionally and/or alternatively, context management module 408 may receive business workflow input 402b from the business workflow module 420. The business workflow input 402b includes textual information such as text describing or defining information necessary to advance the business workflow. The context management module 408 may determine the context of the business workflow input 402b is a request for input from the user, and may pass the business workflow input 402b to TTS module 410 to be converted to audio for subsequent presentation to the user. Context management module 408 may optionally reformulate or define the manner in which the information represented in the business workflow input 402b is presented to the user, e.g. by presenting the necessary information described/defined by the business workflow module 420 in interrogative form.

In embodiments where, for any of a variety of possible reasons, the information provided to TTS module 410 may not be converted to speech, such information may be provided in the form of optical output 404a, e.g. an image of characters to be presented to the user via a display of a mobile device.

Returning to context management module 408, as shown in FIG. 4 the context management module is also communicatively coupled to an invoking module 412 in preferred approaches. In brief, the invoking module 412 facilitates invoking various different applications, components, etc. of or available to a mobile or other device implementing the architecture 400. In particularly preferred embodiments, and generally in response to receiving an indication from context management module 408 that input 402a received from the user corresponds to or is an instruction to invoke a particular application, component, etc., the invoking module calls the particular application, component, etc. and facilitates performing a contextually appropriate action.

For example, and in the context of input indicating a user's desire to capture an image or video, context management module 408 may provide such indication to the invoking module 412, which in turn may invoke a native camera application or other specific optical input capture application (e.g. if a particular third party application has been installed on the mobile device and associated with the architecture) and/or a system call to one or more optical sensors of the mobile device.

Of course, in other embodiments invoking module 412 may invoke other software and/or hardware accessible to the architecture 400, such as audio sensors and corresponding capture software, location/position sensors (e.g. GPS antenna, compass, gyroscope, accelerometer, etc.) and associated capture software, network components, etc. as would be understood by a person having ordinary skill in the art upon reading the present descriptions.

Accordingly, and in preferred approaches the invoking module 412 is communicatively coupled to the context management module 408 and an input processing module 414. Input processing module 414 represents a core component of the architecture 400, and generally is configured to perform functions including capturing optical input 402o, e.g. using a camera of the mobile device; detect objects depicted in the optical input 402o, especially documents of different types; determining and/or recognizing the type of object (again, especially for documents); and extracting content from the optical input 402o. Optionally, extraction may be based on the object type, and/or other features as described herein and in the related patent documents.

In one embodiment, therefore, the invoking module 412 may preferably invoke the input processing module 414, optionally as part of a separate capture and processing application, in response to receiving indication(s) from context management module 408 that a user requests, and/or a business workflow needs, to capture optical input 402o.

In some approaches, the input processing module 414 may perform the foregoing configured functions, and provide the result(s) thereof to an output module 418 configured to display, store, and/or pass the result(s) to a display of the mobile device (e.g. for user review/confirmation/correction), a memory or data store of the mobile device (e.g. for future use), and/or the business workflow (e.g. via business workflow module 420).

In other approaches, input processing module 414 may perform the foregoing configured functions, and provide the result(s) thereof to validation module 416. The validation module 416 validates the extraction result against reference information, e.g. information defining an appropriate set of characters that may be included in the extraction result, information provided by a user confirming, negating, or modifying the extraction result, etc. Optionally but preferably, in response to determining the information is not valid (i.e. an error exists), the validation module 416 may correct the error, e.g. by replacing erroneous extraction results partially or wholly with information used to validate the extraction result. In this manner, extraction errors such as OCR errors may be robustly handled without requiring recapture of the information from which the results were extracted.

As referenced above, validation module 116 may validate and/or correct extraction results based on feedback from a user. In such approaches, therefore, the validation module is therefore preferably configured to receive auditory input 402a and/or optional tactile input 402t. As a further option, the validation module 116 may be communicatively coupled to the ASR/NLP module 406 and receive auditory input 402a via the ASR/NLP module 406.

To further facilitate validation of extraction results and/or correction of erroneous extraction results, the validation module 416 is optionally but preferably communicatively coupled to the context management module 408. This communicative coupling facilitates validation and particularly error correction by enabling the use/incorporation of correction information utilized by the validation module 416 (e.g. user feedback correcting an extraction result from optical input, a parsing result from auditory input, etc.) in the processes of speech recognition, language parsing, and context determination as performed by ASR/NLP module 406 and/or context management module 408, in various approaches.

To even further facilitate validation and/or correction, the communicative coupling between validation module 416 and context management module 408 is preferably a two-way connection. Two-way communicative coupling facilitates the contextual information applied/determined by context management module to be utilized in the process of receiving input from a user for purposes of error correction and/or extraction validation, in various embodiments.

While the foregoing description of FIG. 4 sets forth an architecture 400 including particular components, receiving and/or providing certain inputs/outputs at various components, etc. as described above, it should be understood that the description of the particular embodiment shown in FIG. 4 is intended to be illustrative and the presently disclosed inventive concepts may be embodied in other suitable systems or architectures described herein and as would be appreciated by a person having ordinary skill in the art upon reading the instant disclosures.

The method 300 shown in FIG. 3, and/or the architecture 400 shown in FIG. 4, as well as various alternative embodiments thereof as described herein, may optionally be implemented in the form of a computer program product without departing from the scope of the present disclosures. In such embodiments, the computer program product may include a computer readable storage medium having program code embodied therewith, the program code readable/executable by a processor to cause the processor to perform steps of a method as described herein, and/or to provide instructions to a system to perform various operations as further described herein, in multiple embodiments.

While various embodiments have been described above, it should be understood that they have been presented by way of example only, and not limitation. For instance, any equivalent of an embodiment disclosed herein that would be appreciated by a person having ordinary skill in the art upon reading these disclosures should be understood as included within the scope of the inventive concepts described herein. Similarly, these inventive disclosures may be combined in any suitable manner, permutation, synthesis, modification, etc. thereof that would be appreciated by a person having ordinary skill in the art upon reading these descriptions.

Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
invoking a mobile application using a mobile device;
receiving auditory input via the mobile device; and
performing a business workflow via the mobile application based on the auditory input.

2. The method as recited in claim 1, wherein performing the business workflow excludes tactile input via the mobile device.

3. The method as recited in claim 1, wherein performing the business workflow comprises:
capturing digital image data;
receiving auditory input relating to the captured digital image data; and
determining a subject of the captured digital image data.

4. The method as recited in claim 3, wherein the subject of the captured digital image is determined based at least in part on the auditory input relating to the captured digital image data.

5. The method as recited in claim 3, wherein performing the business workflow further comprises:
determining information necessary for performing the business workflow, the determining being based on at least one of:
the subject of the captured digital image data; and
the auditory input relating to the captured digital image data; and
extracting from the digital image data the information necessary for performing the business workflow.

6. The method as recited in claim 1, further comprising determining, from the auditory input, information necessary to perform the business workflow.

7. The method as recited in claim 1, further comprising retrieving, based on the auditory input, information necessary to perform the business workflow.

8. The method as recited in claim 7, wherein the necessary information is retrieved from a third party data source remote from the mobile device.

9. The method as recited in claim 1, wherein the auditory input comprises information necessary to perform the business workflow.

10. The method as recited in claim 1, wherein the auditory input further comprises ancillary information.

11. The method as recited in claim 1, wherein the auditory input comprises information necessary to perform the business workflow and ancillary information, and
wherein the method further comprises associating the ancillary information with the necessary information.

12. The method as recited in claim 1, wherein the auditory input comprises one or more of a user affirmation, a user negation, and a user modification of information necessary to perform the business workflow.

13. The method as recited in claim 12, wherein one or more of the user affirmation, the user negation, and the user modification are received from the user in response to a request to validate the information necessary to perform the business workflow.

14. The method as recited in claim 1, wherein performing the business workflow comprises:
parsing the auditory input;
determining information necessary to perform the business workflow based on the parsing; and
selectively providing the necessary information to the business workflow.

15. The method as recited in claim 14, wherein the parsing is based on natural language processing (NLP) techniques.

16. The method as recited in claim 14, wherein the parsing imperfectly determines the information necessary to perform the business workflow, the method further comprising:
receiving additional auditory input via the mobile device;
parsing the additional auditory input;
determining the information necessary to perform the business workflow from the additional auditory input;
comparing the information necessary to perform the business workflow as determined from (i) the auditory input; and (ii) the additional auditory input; and
perfecting the information necessary to perform the business workflow based on the comparison.

17. The method as recited in claim 14, wherein the parsing imperfectly determines the information necessary to perform the business workflow, and the method further comprising:
receiving optical input via the mobile device;
extracting the information necessary to perform the business workflow from the optical input;
comparing the information necessary to perform the business workflow as determined from the auditory input with the information necessary to perform the business workflow as extracted from the optical input; and
perfecting the information necessary to perform the business workflow based on the comparison.

18. The method as recited in claim 1, further comprising verbally requesting the auditory input via the mobile device.

19. The method as recited in claim 18, wherein the verbal request is generated via the mobile device using a text-to-speech engine.

20. The method as recited in claim 18, wherein the verbal request identifies information necessary to perform the business workflow.

* * * * *